(12) United States Patent
Armentrout

(10) Patent No.: US 11,499,500 B2
(45) Date of Patent: Nov. 15, 2022

(54) SYSTEMS AND METHODS FOR SEAL RETENTION

(71) Applicant: Caterpillar Inc., Deerfield, IL (US)

(72) Inventor: Jessica P. Armentrout, Schertz, TX (US)

(73) Assignee: Caterpillar Inc., Peoria, IL (US)

( * ) Notice: Subject to any disclaimer, the term of this patent is extended or adjusted under 35 U.S.C. 154(b) by 284 days.

(21) Appl. No.: 16/434,452

(22) Filed: Jun. 7, 2019

(65) Prior Publication Data

US 2020/0386312 A1 Dec. 10, 2020

(51) Int. Cl.
| | | |
|---|---|---|
| *F02F 11/00* | (2006.01) | |
| *F02F 7/00* | (2006.01) | |
| *F16J 15/06* | (2006.01) | |
| *F16J 15/20* | (2006.01) | |

(52) U.S. Cl.
CPC .............. *F02F 11/00* (2013.01); *F02F 7/006* (2013.01); *F02F 11/002* (2013.01); *F16J 15/062* (2013.01); *F16J 15/20* (2013.01)

(58) Field of Classification Search
CPC ....... F02F 7/0068; F02F 11/00; F02F 2200/04
See application file for complete search history.

(56) References Cited

U.S. PATENT DOCUMENTS

| | | | |
|---|---|---|---|
| 5,564,177 A | 10/1996 | Fernandes et al. | |
| 2002/0067005 A1* | 6/2002 | Bock | F16J 15/122 |
| | | | 277/591 |
| 2003/0094879 A1* | 5/2003 | Kobayashi | H02K 15/0062 |
| | | | 310/238 |
| 2008/0250963 A1* | 10/2008 | Fink | F42B 3/198 |
| | | | 102/202.8 |
| 2009/0173310 A1* | 7/2009 | Sedlar | F16J 15/061 |
| | | | 123/195 C |
| 2010/0207334 A1* | 8/2010 | Virgin | B32B 3/266 |
| | | | 277/654 |
| 2011/0000455 A1* | 1/2011 | Smith | F02F 7/006 |
| | | | 29/888.011 |
| 2011/0000456 A1* | 1/2011 | Smith | F02F 7/006 |
| | | | 123/195 C |
| 2017/0152809 A1* | 6/2017 | Wicks | F02F 1/14 |
| 2019/0332036 A1* | 10/2019 | Robles Flores | G03G 15/0898 |

FOREIGN PATENT DOCUMENTS

| | | |
|---|---|---|
| DE | 19634789 | 3/1998 |
| WO | 2009065420 | 5/2009 |

* cited by examiner

*Primary Examiner* — Long T Tran
(74) *Attorney, Agent, or Firm* — Schwegman Lundberg & Woessner, P.A.

(57) ABSTRACT

A component comprises a mounting surface to male with another component, a seal channel extending into the mounting surface, and retention tabs extending into the seal channel at or below the mounting surface, wherein the retention tabs are spaced from each other about a perimeter of the seal channel. A method for manufacturing a component comprises producing a component with a seal channel in a flat mate face and mounds of material adjacent the seal channel that extend away from the flat mate face, and deforming the mounds of material to form retention tabs extending into the seal channel.

20 Claims, 6 Drawing Sheets

SYSTEMS AND METHODS FOR SEAL RETENTION

TECHNICAL FIELD

The present application relates generally, but not by way of limitation, to strips of material used for sealing between two coupled components, such as can be used in various applications, including industrial, paving, agricultural, construction and earth-moving machines. More particularly, the present application relates to systems and methods for retaining seal members within grooves or channels of a component.

BACKGROUND

Machines such as industrial, paving, agricultural, construction and earth-moving machines typically utilize combustion engines as a power source for providing motive force to the machine as well as for generating power for operation of other systems, such as hydraulic systems, cooling systems and the like. In assembling the combustion engines for installation in such machines, it can therefore become desirable to mount accessory components to the engine. For example, fuel pumps, water pumps and compressor housings can be mounted directly to an engine block. In order to provide sealing between the accessory component and the engine block, seal members can be positioned between surfaces of the accessory component and the engine block. These seal members thus prevent the leakage of various fluids, such as lubricating fluids, cooling water or hydraulic fluid from leaking out of the engine as fluid moves between the accessory component and the engine block.

As the accessory component is assembled to the engine block, one or more seal members can be positioned between a mate face of the component and a mounting surface of the engine block as they are brought together for joining, such as via threaded fasteners. It can, however, be difficult to maintain a seal member in a desired position, such as within a seal groove or channel, while the two surfaces are brought together. If the seal member is not effectively retained during assembly, it can become improperly located and be pinched or severed and thereby not be effective at sealing, can leave a gap in the interface of the surfaces that is not sealed properly, or the seal can fall out completely resulting in no flexible compression seal and leaving only a metal-to-metal interface that in some cases may go undetected before it reaches the end user.

U.S. Pat. No. 5,564,177 to Fernandes et al., entitled "Method of Making Captive O-Ring Face Seal" discloses a face seal having a lip for engaging an annular seal.

SUMMARY OF THE INVENTION

A component for mating along a seal interface can comprise a mounting surface to mate with another component, a seal channel extending into the mounting surface, and a plurality of retention tabs extending into the seal channel at or below the mounting surface, wherein retention tabs of the plurality of retention tabs are spaced from each other about a perimeter of the seal channel.

A method for manufacturing a component having a seal channel with a retention tab can comprise forming a component to have the seal channel disposed in a flat mate face and a plurality of mounds of material adjacent the seal channel, the plurality of mounds of material extending away from the flat mate face, and deforming the plurality of mounds of material to form a plurality of retention tabs extending into the seal channel.

DETAILED DESCRIPTION

Figure 1:
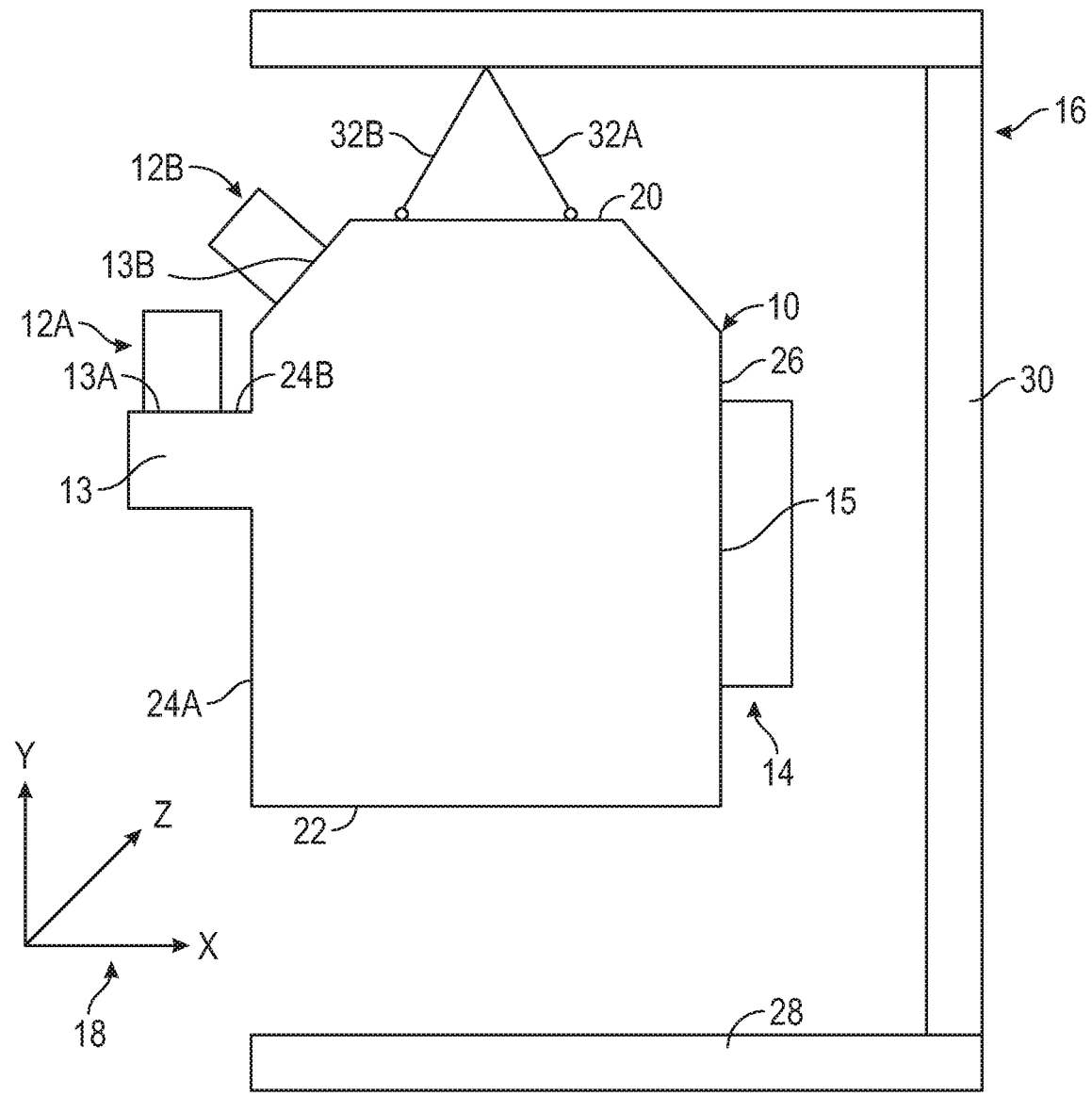
FIG. 1 is a schematic side view of a machine system having two components mounted thereto.

FIG. 1 is a schematic side view of a machine system 10 having components 12A, 12B, and 14 mounted thereto at interfaces 13A, 13B, and 15, respectively. Machine system 10 can be mounted in carrier 16. In an example, machine system 10 can comprise an engine block and components 12A, 12B, and 14 can comprise accessory housings, such as a compressor, water pump, and an oil cooler, respectively. Machine system 10 can be mounted in carrier 16 to, for example, facilitate assembly with components 12A, 12B and 14 and other components before assembly into a vehicle or machine. Carrier 16 can comprise any structure for supporting machine system 10 in an upright orientation relative to coordinate system 18, which can comprise X-direction, Y-direction and Z-direction. Machine system 10 can comprise top surface 20 and bottom surface 22 between which side surfaces 24 and 26 extend, Carrier 16 can comprise base 28, stanchion 30 and supports 32A and 32B.

Carrier 16 can be configured to support machine system 10 in an upright position so that side surface 26 is parallel to the Y-direction of coordinate system 18, side surface 24A is parallel to the X-direction of coordinate system 18, and side surface 32B is oriented at an acute or oblique angle to X-direction of coordinate system 18. For example, base 28 can be configured to move machine system 10 from station-to-station along an assembly line such that it is impractical or difficult to reposition machine system 10 in other orientations. As such, accessories 12A, 12B, and 14 are often mounted to machine system 10 with side surface 26 parallel to the Y-direction, side surface 24A parallel to the X-direction with the mounting face oriented down, and side surface 32B at an acute angle to X-axis of coordinate system 18. As indicated, components 12A, 12B, and 14 can comprise housings for accessories that transfer fluid to or from machines system 10. Thus, it is typically advantageous to include a seal arrangement between machine system 10 and components 12A, 12B, and 14. However, due to the orientation of machine system 10, with side surfaces 24A, 26, and 32B being oriented vertically or at an angle acute to the X-axis, seal members of the sealing arrangements, such as compliant closed-loop seals, can be difficult to maintain in position to provide proper sealing. For example, the seal members can become dislodged from seal channels located in one of machine system 10 and components 12A, 12B, and 14, thereby resulting in pinching or outright dislodgement.

The present inventor has recognized that previous solutions to retaining seal members in seal channels can have drawbacks. For example, components can be manufactured with seal channels that are subsequently shaped to have a dovetail profile, similar to what is described in the aforementioned patent to Fernandes et al. Producing this shape typically requires expensive and time-consuming machining processes, particularly for steel and cast-iron components. These machining processes additionally can require tight tolerances that can require additional dimensional inspection. Furthermore, die cast components typically cannot include the dovetail feature due to draft angles designed to facilitate removal of the component from the die. Other solutions involve the use of a non-Newtonian gel to aid in the retention of the seal member in the seal channel. However, such gels can fill leak paths, which masks the ability of leak testing methods to detect a leak path resulting from a damaged or missing seal member. The leaks are then typically not discovered until the gel has dissipated at elevated temperatures while the machine in which the seal member has been installed is out in the field. Furthermore, gels can be applied inconsistently during the assembly stage of the manufacturing process, which can additionally affect retention capability.

The present disclosure is directed to systems and methods for retaining seal members within seal channels such that two components can be brought together, regardless of orientation, to join two parallel, flat surfaces without pinching or damaging a seal member, and without the need for expensive or time-consuming manufacturing processes.

Figure 2:
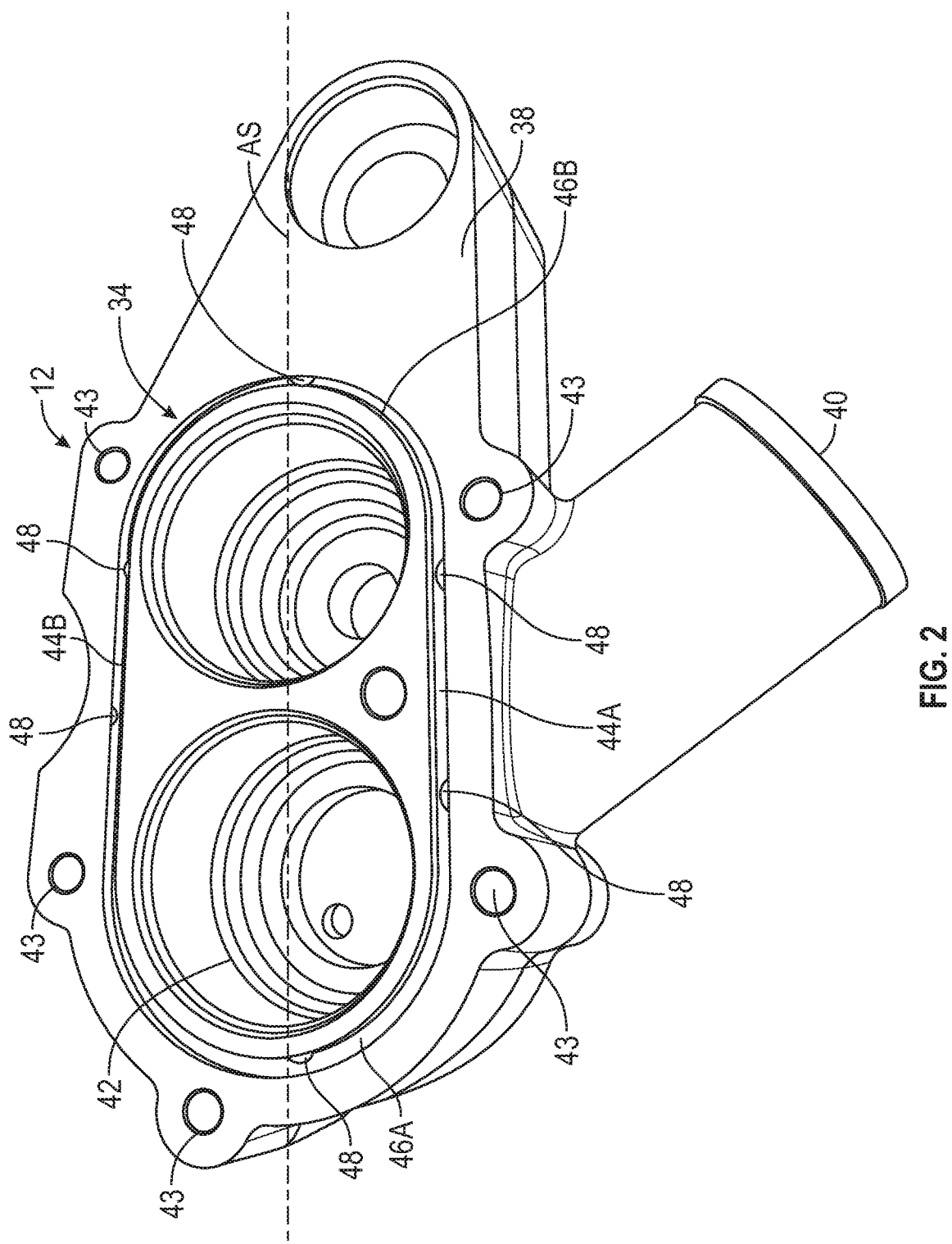
FIG. 2 is perspective view of a component for mounting to the machine system of FIG. 1, wherein the component has a closed-loop seal channel.

FIG. 2 is perspective view of component 124 for mounting to machine system 10 of FIG. 1, wherein component 124 has a stadium seal channel 34. Component 124 can comprise housing 36 having mate face 38, fluid inlet 40, fluid outlet 42. Component 124 of FIG. 3 can additionally represent component 12B of FIG. 1. Mate face 38 can be configured to mount flush to another component, such as machine system 10 of FIG. 1, such as via the use of fasteners at flanges 43. Component 12A can be configured to guide or direct fluid from outside of machine system 10 to inside of machine system 10 such as by mounting housing 36 to machine system 10 such that fluid outlet 42 aligns with an opening or orifice in machine system 10. In order to prevent fluid from escaping from between mate face 38 and machine system 10, seal channel 34 can be positioned within mate face 38 to receive a seal member. Seal channel 34 can be recessed below mate face 38 to allow mate face to mount flush with machine system 10. As such, a resilient seal member can be positioned within seal channel 34 to press against a surface of machine system 10 to inhibit egress of fluid.

Seal channel 34 can have a variety of shapes, including closed-loop shapes that enclose an area by the bounds of the seal channel. In the illustrated example, seal channel 34 comprises a stadium shape wherein an area is enclosed by the bounds of seal channel 34. However, the present disclosure can be readily applicable to other shapes, such as an annular shape, an ovoid shape, a circular shape, irregular shapes that do not form a common or typical geometric feature, and non-closed loop shapes. In the illustrated example of FIG. 2, seal channel has an oblong stadium shape that is symmetric about axis of symmetry AS. For example, seal channel 34 can comprise first straight leg 44A, second straight leg 44B, first arcuate end 46A and second arcuate end 46B. First straight leg 44A and second straight leg 44B can have the same shape, and first arcuate end 46A and second arcuate end 46B can have the same shape. Thus, a first side of seal channel 34 can include a quarter circle segment formed by half of first arcuate end 46A, first straight leg 44A and a quarter circle segment formed by half of second arcuate end 46B, which can be nearly identically shaped as a second side of seal channel 34 that can include a quarter circle segment formed by half of first arcuate end 46A, second straight leg 44B and a quarter circle segment formed by half of second arcuate end 46B. However, the present disclosure is applicable to other symmetrically shaped seal channels, such as circular, square, rectangular and other non-symmetrical shapes, such as those shown in FIG. 8.

In order to prevent a seal member from being dislodged from seal channel 34, retention tabs 48. As discussed in greater detail below, retention tabs 48 can be placed in various locations around seal channel 34 to extend into seal channel 34 in such a manner to allow a resilient seal member to pass into seal channel 34 in a deformed state and to prevent an undeformed resilient seal member from unintentionally or inadvertently being removed from seal channel 34. Retention tabs 48 can form a series of discretely formed and spaced apart bodies that can be positioned in at locations and intervals sufficient to retain a seal member without providing a ledge or lip all the way around one or both sides of the seal channel.

Figure 3:
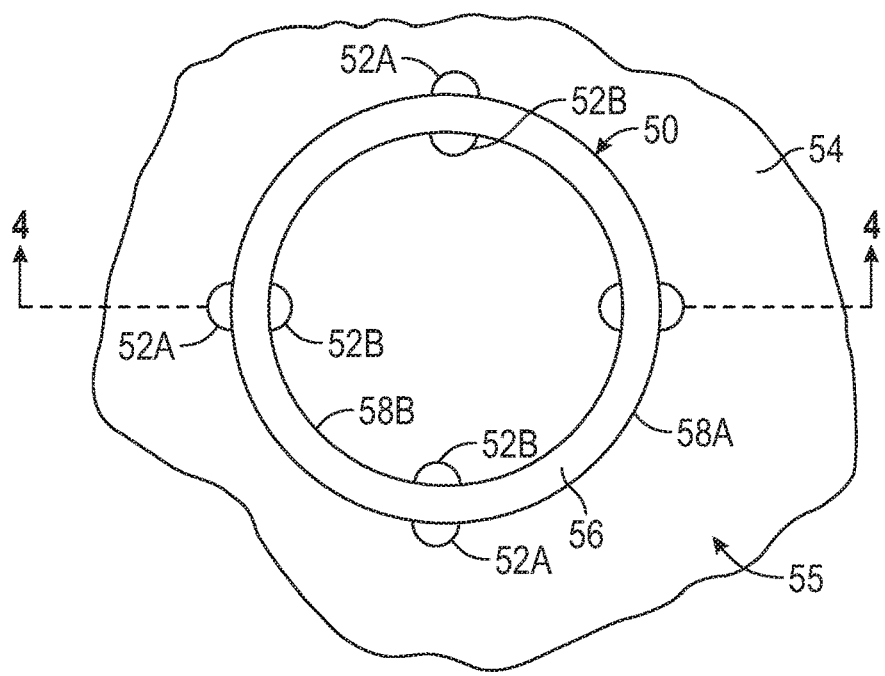
FIG. 3 is plan view of an annular seal channel having raised protrusions of the present disclosure.
Figure 4:
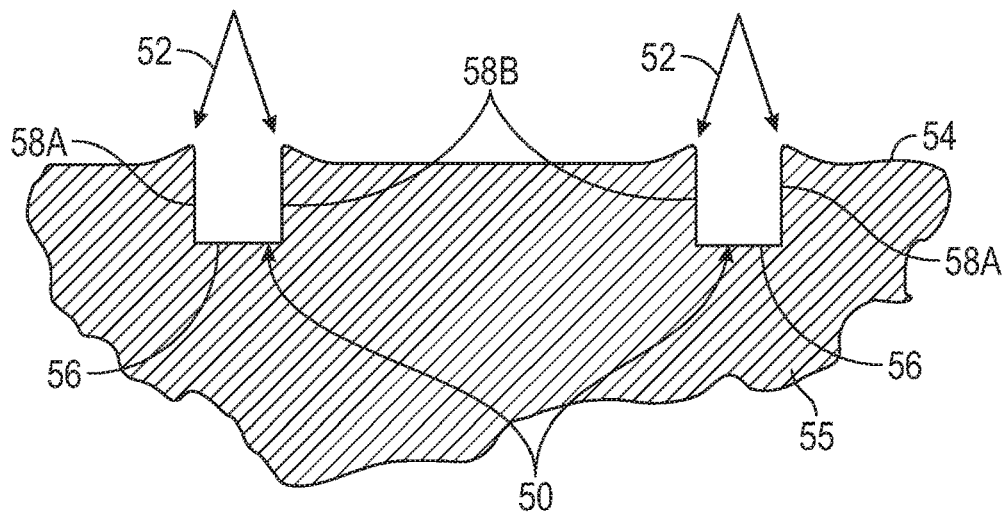
FIG. 4 is cross-sectional view of the annular seal channel of FIG. 3 taken at section 4-4 to show profiles of the raised protrusions.

FIG. 3 is plan view of a circular seal channel 50 having raised protrusions 52 of the present disclosure. FIG. 4 is cross-sectional view of circular seal channel 50 of FIG. 3 taken at section 4-4 to show profiles of raised protrusions 52. FIGS. 3 and 4 are discussed concurrently.

Figure 5:
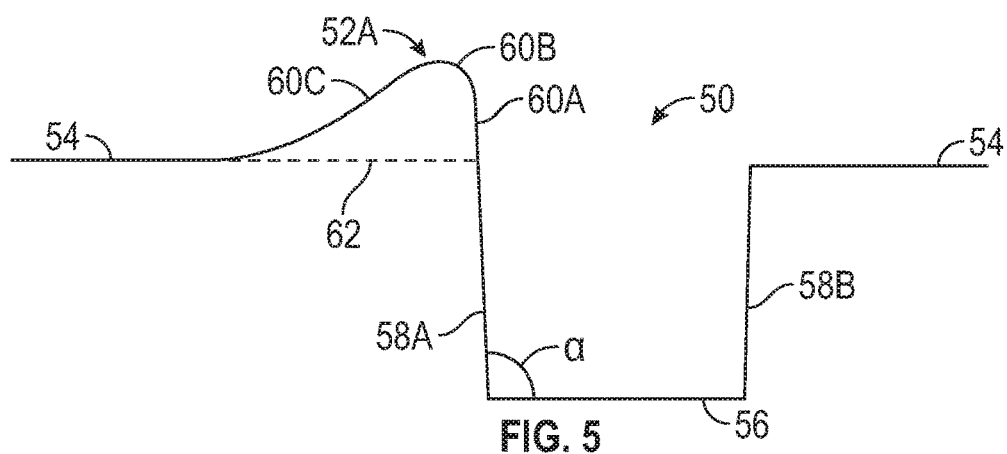
FIG. 5 is a close-up view of an exemplary raised protrusion of the present disclosure.

Seal channel 50 can be disposed in mate face 54 of component 55. Seal channel 50 can have a rectilinear shape, such as rectangular, square, trapezoidal and the like. In the illustrated embodiment, seal channel 50 has a square shape with bottom wall 56, first sidewall 58A and second sidewall 58B. As shown in FIG. 5, sidewalls 58A and 58B of seal channel 50 can be provided with a slight draft angle such that component 55 can be more readily removed from a die or casting cavity.

Outer raised protrusions 52A can be positioned at first sidewall 58A and inner raised protrusions 52B can be positioned at second sidewall 58B. Seal channel 50 can comprise a circular shape and raised protrusions 52 can be distributed about the length (e.g., the length of a centerline of seal channel 50 that extends along the center of bottom portion 56 of seal channel 50 between sidewalls 58A and 58B) of seal channel 50 in a uniform or regular pattern. Outer raised protrusions 52A can be paired with opposing inner raised protrusion 52B. In the illustrated example, four of each of protrusions 52A and 52B are distributed at locations equidistant from each other around the length of seal channel 50, ninety degrees apart. However, other staggered patterns can be used. In other examples, outer raised protrusions 52A can be positioned at different circumferential locations than inner raised protrusion 52B. For example, protrusions 52A can be spaced ninety degrees from each other and protrusions 52B can be spaced ninety degrees from each other, but with forty-five degrees of spacing between successive protrusions 52A and 52B. Also, in other examples, raised protrusions 52A and 523 can be spaced from each other along the length of seal channel at irregular intervals, as shown and discussed with reference to FIG. 8. Additionally, in other examples of raised protrusions 52, only outer raised protrusions 52A or inner raised protrusions 52B can be used.

Raised protrusions 52 can be monolithic with material forming seal channel 50 in component 55. As such, raised protrusions 52 can be integrally formed with component 55 during or as part of a single manufacturing process.

Raised protrusions 52 are positioned and shaped to be mechanically deformed and subsequently obstruct different portions of seal channel 50. A mechanical deformation process can be used to move material forming raised protrusions 52 that is outward of mate face 54 to be inward of mate face 54, thereby pushing other material of component 55 into space defined by seal channel 50. The space of seal channel 50 can be the space between sidewalls 58A and 58B that is above bottom wall 56 and below mate face 54. As such, the space of seal channel 50 can be reduced by the presence of deformed material of raised protrusions 52 1) being extended into seal channel 50 or 2) pushing other material into seal channel 50.

FIG. 5 is a close-up view of an exemplary raised protrusion 52A of FIGS. 3 and 4 according to the present disclosure. Raised protrusion 52A can comprise a shape having side portion 60A, tip portion 60B and projection portion 60C. An opposing raised protrusion 52B is omitted for simplicity, but can have a similar shape. Raised protrusion 52A can be positioned proximate sidewall 58A. In examples, raised protrusion 52A is positioned such that side portion 60A can be an extension of sidewall 58A such that side portion 60A and sidewall 58A are coplanar. It can be desirable for side portion 60A and sidewall 58A to be coplanar because a gap therebetween could form a crack in component 55 as the material of raised protrusion 52A folds over the top of mate face 54.

In examples, the width of the raised protrusion 52A can be less than the total length of seal channel 50 or a side or segment of seal channel 50. In examples, raised protrusion 52A can have a width (e.g., in to the plane of FIG. 5) that is approximately two to three times the height of the projection above mate face 54. Such a width facilitates plastic deformation of raised protrusion 52A sideways into seal channel 50 and lengthwise along seal channel 50.

As shown in FIG. 5, side-walls 58A and 58B can be disposed at draft angle α to the direction perpendicular to bottom wall 56 to provide a draft angle to facilitate removal of component 55 from a cavity of a mold or die. In examples, draft angle α (which is not shown to scale in FIG. 5) can be approximately 1/2° to approximately 3°.

In examples, raised protrusion 524 can comprise a triangular or wave shape. Specifically, side portion 60A, projection portion 60C and theoretical extension 62 of mate face 54 can form a triangular shape where, in examples, side portion 60A and theoretical extension 62 are disposed relative to each other at, or nearly at due to draft angle α, a right angle. Side portion 60A and projection portion 60C can come together at a rounded surface formed by tip portion 60B, giving the triangular shape a wave shape. Thus, in examples, protrusion 52A can be waveform in shape with the bulk of material and crest close to the seal channel 50 and tapering away from seal channel 50 more gradually. Shaping of raised protrusion 52A in such a manner facilitates pushing of the material of raised protrusion 52A, in addition to or instead of material of component 55 adjacent seal channel 50, into seal channel 50 when mechanically deformed, such as via being impacted by a force in a direction perpendicular to mate face 54. The tapering formed by projection portion 60C and the rounding of the tip formed by tip portion 60B can facilitate movement of the material of raised protrusion 52A in the desired direction into seal channel 50 as explained with reference to FIG. 6.

Figure 6:
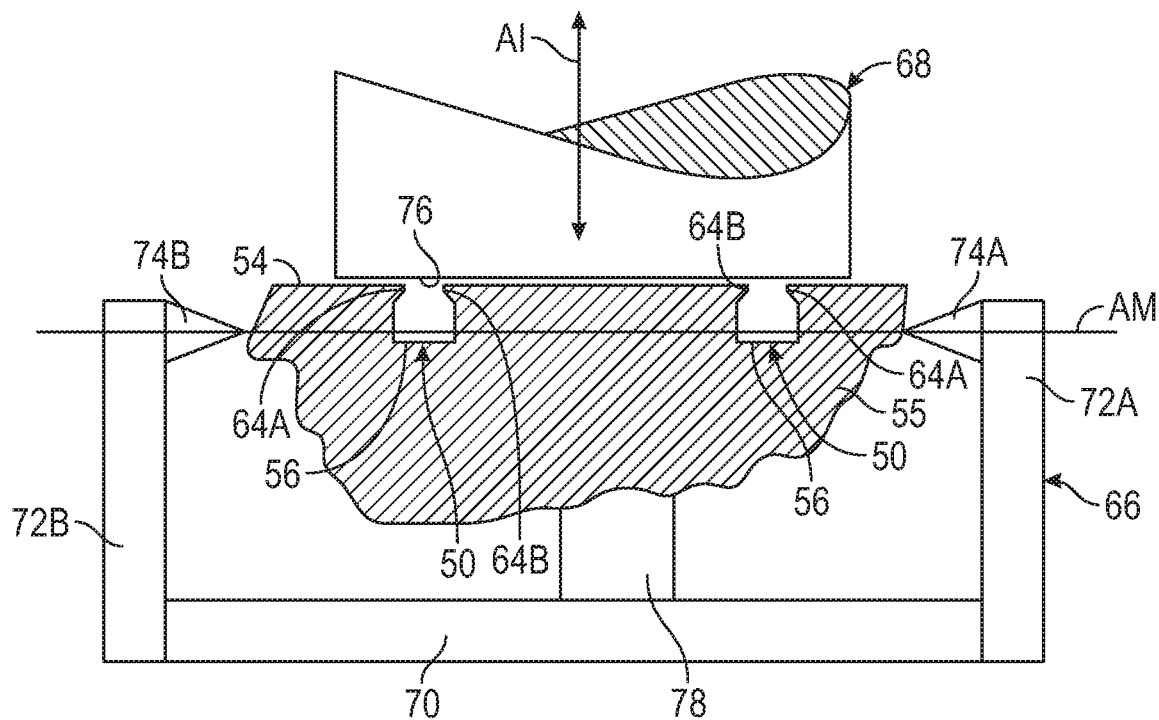
FIG. 6 is a schematic illustration showing the raised protrusions of FIG. 4 having been deformed to overhang the circular seal channel.

FIG. 6 is a schematic illustration showing raised protrusions 52A and 52B of FIG. 4 having been deformed to overhang circular seal channel 50 and form retention tabs 64A and 64B, respectively. Component 55 can be mounted in fixture 66 that can be configured to hold mate face 54 is a desired orientation relative to punch 68. Fixture 66 can comprise base 70, arms 724 and 72B and grippers 74A and 74B. Punch 68 can comprise impact face 76. Fixture 66 and punch 68 are not drawn to scale relative to component 55 in FIG. 6.

Punch 68 and fixture 66 can be configured specifically to operate with the shape and geometry of component 55 and the shape and location of seal channel 50 located thereon. Punch 68 can be connected to a power system for providing motive force to punch 68 such that punch 68 can move along impact axis AI. Base 70 and arms 72A and 72 can be configured to hold component 55 in a fixed position relative to punch 68 and in such a manner that component 55 can braced for receiving an impact from punch 68. As such, fixture 66 can include various bumpers or cradles 78 to position and brace component 55. Grippers 74A and 743 can engage component 55 in a precise and repeatable manner, such that multiple identical instances of component 55 can be reproducibly mounted in fixture 66 in the same orientation. Grippers 74A and 74B can hold component 55 such that mate face extends parallel to mounting axis AM. Punch 68 can be disposed relative to fixture 66 such that impact face 76 is parallel to impact axis AI, Impact face 76 of punch 68 can have a width sufficient to extend across one or more of raised protrusions 52 (FIG. 4). As such, punch 68 can deliver energy to all raised protrusions 52 in a consistent, even manner. Perch 68 can be pushed or otherwise moved toward component 55 such that impact face 76 meets mate face 54. Punch 68 can be delivered with sufficient force to mechanically deform raised protrusions 52 into retention tabs 64A and 64B. As such, material forming raised protrusions 52 will be pushed into forming retention tabs 64A and 64B.

As mentioned with reference to FIG. 5, the tapering formed by projection portion 60C and the rounding of the tip formed by tip portion 60B can facilitate movement of the material of raised protrusion 52A in the desired direction into seal channel 50. Thus, as impact face 76 engages tip portion 60B, material of raised protrusion 52 can expand outward toward both side portion 60A and projection portion 60C. However, as punch 68 advances closer to mate face 54, the increasing distance of projection portion 60C from side portion 60A provides more resistance to the flow of material, thereby inducing flow of material of raised protrusion 52 toward sidewall 58A of seal channel 50. Further, because there is no material of component 55 at seal channel 50, no resistance to the flow of material is met. Thus, raised protrusion 52 can cause a flow of material of component 55 into seal channel 50 as impact face 76 push down and displaces raised protrusion 52 to form retention tab 64A.

Figure 7:
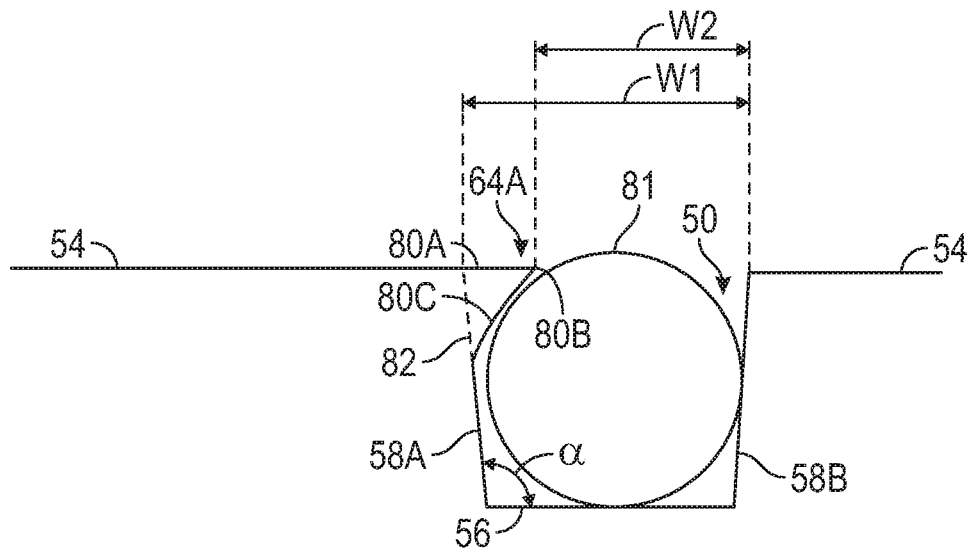
FIG. 7 is a close-up view of an exemplary deformed raised protrusion of the present disclosure shaped into a retention tab.

FIG. 7 is a close-up view of an exemplary deformed raised protrusion 52A of FIG. 5 according to the present disclosure shaped into retention tab 64A. Seal member 81 can be located is seal channel 50.

Retention tab 64A can comprise a shape having side portion 80A, tip portion 80B and projection portion 80C. An opposing retention tab 649 is omitted for simplicity, but can have a similar shape. Retention tab 64A can be formed between mate face 54 and sidewall 58A. In examples, retention tab 64A can be positioned such that side portion 80A can be an extension of mate face 54 such that side portion 804 and mate face 54 are coplanar. In examples, retention tab 644 can comprise a triangular or sawtooth shape. Specifically, side portion 80A, projection portion 80C and theoretical extension 82 of sidewall 584 can form a triangular shape where side portion 80A and theoretical extension 82 are disposed relative to each other at, or nearly at due to draft angle $\alpha$, a right angle. Side portion 80A and projection portion 80C can come together at a rounded surface formed by tip portion 80B, giving the triangular shape a sawtooth shape. Shaping of retention tab 64A in such a manner retention of a seal member within seal channel 50 without interfering with the ability of mate face 54 to mate flush with an adjacent planar surface, such as when mounted to machine system 10.

Note that raised protrusion 52A of FIG. 5 and retention tab 64A of FIG. 7 are not necessarily drawn to scale. The net cross-sectional area of retention tab 64A can be approximately the same as the net cross-sectional area of raised protrusion 52A as material is shifted around within component 55. However, retention tab 64A can be smaller than raised protrusion 52A due to compression of material that can occur during the deformation process.

At mate face 54, first sidewall 58A can be spaced from second sidewall 58B a distance defined by width W1. Retention tab 64A can extend partway across seal channel 50 from sidewall 58A toward sidewall 58B, to overhang bottom wall 56 such that tip portion 809 is spaced from second sidewall 58 a distance defined by width W2. How far across bottom wall 56 retention tab 64A extends depends on the initial cross-sectional area (or volume) of raised protrusion 52A, width W1 and the size and material of seal member 81 intended to be used in seal channel 50, among other things. The difference of W1-W2 should be greater than a minimum width to which seal member 81 can be compressed. In examples, W2 can be approximately 50%, 66% or 75% of W1. In examples, where an opposing retention tab 64B is aligned directly across from retention tab 64A, W2 can be at or less than 50% of W1, such as approximately 66%, 75% or 80%. Seal member 81 can be fabricated from a resilient material that can have a set shape, can be stretched, compressed or otherwise deformed to a different shape, and can then under its own power return back to the set shape. In examples, seal member 81 can be fabricated from rubber, polymer or polytetrafluoroethylene (PTFE). Seal member 81 can have a circular cross-sectional shape, as illustrated, but can also have other shapes, such as square, rectangular or toroidal.

Figure 8:
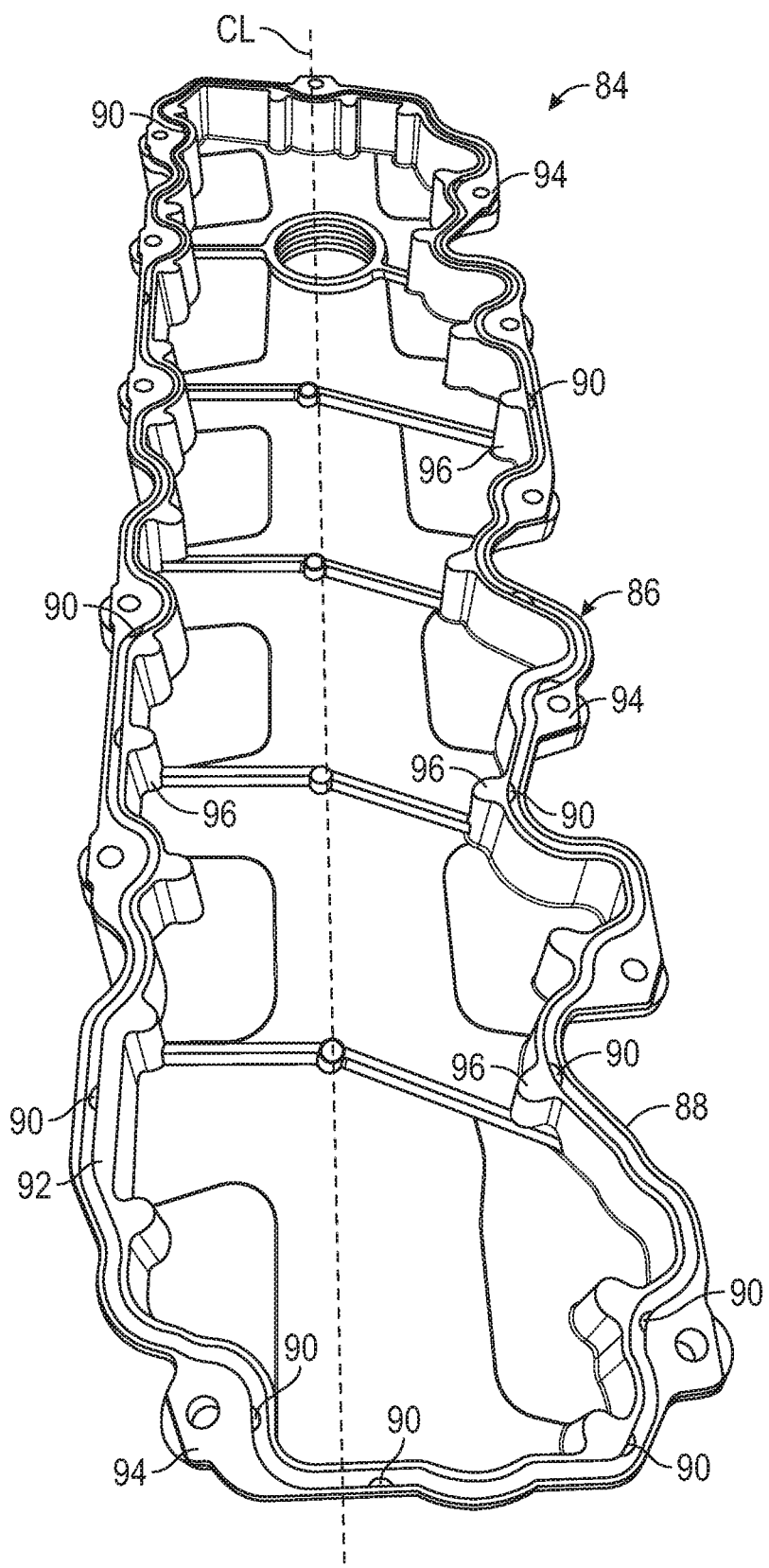
FIG. 8 is a perspective view of a component for mounting to the machine system of FIG. 1, wherein the component has an irregularly-shaped closed-loop seal channel.

FIG. 8 is a perspective view of component 84 for mounting to machine system 10 of FIG. 1, wherein component 84 has irregularly-shaped, closed-loop seal channel 86. Component 84 can comprise an example of component 14 of FIG. 1. Component 84 can comprise, for example, a valve or cylinder head cover for an engine block. As such, perimeter 88 of the cover can extend along a circuitous route, moving closer to and further away from centerline CL. Component 84 can include a plurality of retention tabs 90 disposed around the perimeter of seal channel 86. Retention tabs 90 can be located anywhere along the perimeter, including along portions of seal channel 86 that extend past other features of component 84, such as thickened walls 92, fastener flanges 94 and reinforcement ribs 96. Thickened walls 92, fastener flanges 94 and reinforcement ribs 96 can provide strength to retention tabs 90 and can facilitate the formation of retention tabs 90 by providing structure to resist the flow of material of raised protrusions 52 and to induce flow of the material towards seal channel 86. Retention tabs 90 can extend coplanar with mate face 98.

Component 84 is illustrated as having an irregular shape such that perimeter 88 is asymmetric about centerline CL. As such, symmetric placement of retention tabs 92 around perimeter 88 is undesirable, if even possible, Thus, retention tabs 92 can be positioned in an irregular pattern or at irregular intervals to retain the seal member. The number and location of retention tabs 90 can be selected to sufficiently hold a seal member in place within seal channel 86 during an assembly process, such as when seal channel 86 is in a vertical position, without the need for having a dovetail profile extend all the way around the perimeter of seal channel 86, as is done in the aforementioned patent to Fernandes et al. Retention tabs 90 can thus be placed at a series of discrete location around the perimeter of seal channel 86, at inner and outer sidewalls, to control the seal member in specific locations. Retention tabs 90 can be placed in only places where retention is desired or believed to be useful in preventing the seal member from dislodging from seal channel 86. For example, retention tabs 9C) can be placed along long, straight stretches of seal channel 86 where a seal member may easily become loose, or along a tight curvature of seal channel 86 where a seal member may protrude from seal channel 86 under bending forces. As such, individual retention tabs 90 can be spaced from each about the inner and outer sidewalls of seal channel 98.

Figure 9:
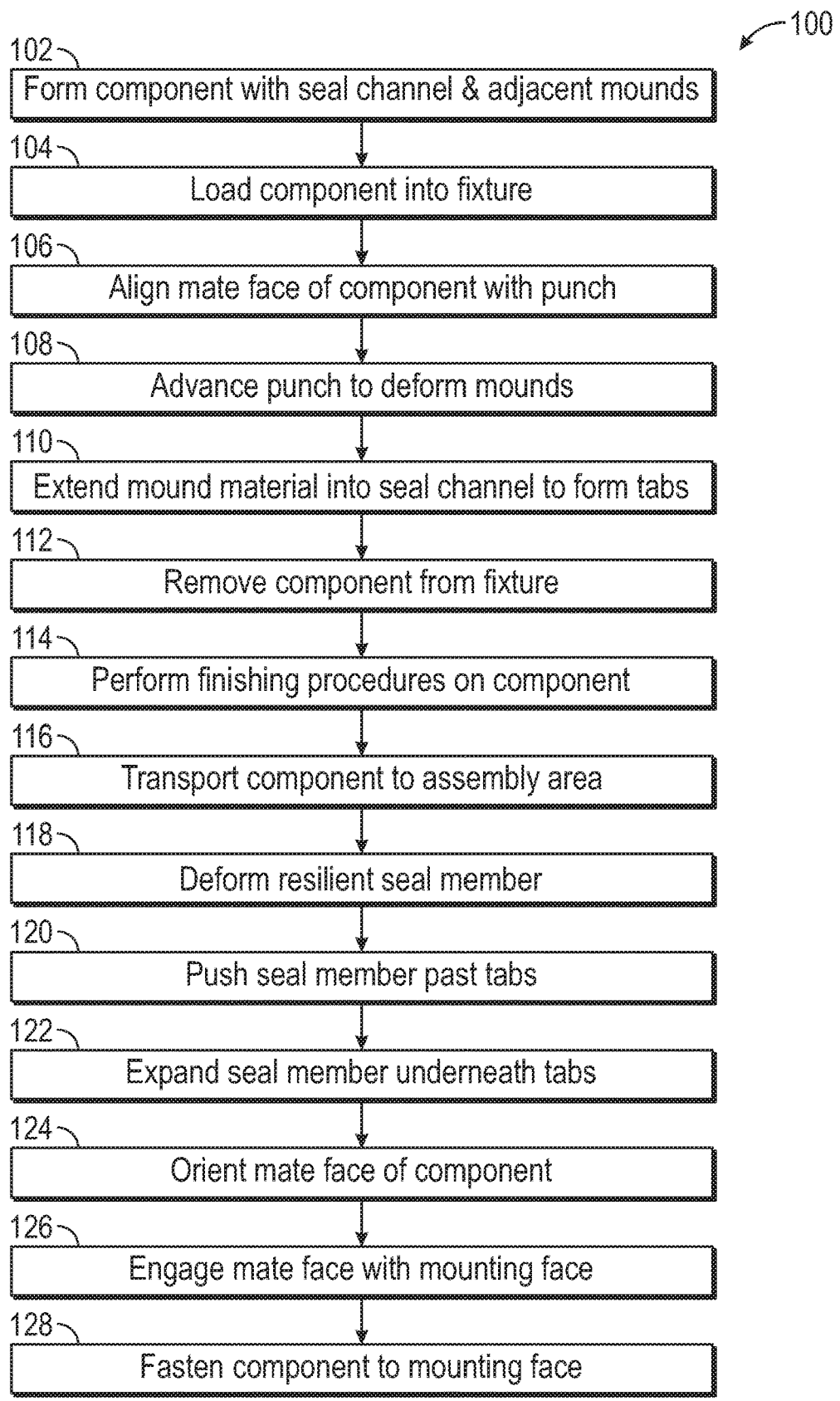
FIG. 9 is a line diagram illustrating methods for manufacturing components having seal channels with retention tabs, installing a seal member into such components, and assembling such components into a system.

FIG. 9 is a line diagram illustrating method. 100 for manufacturing a component with integral seal channel mounds to form retention tabs, installing a seal member in such components, and installing such component into a system.

At step 102, a component can be formed with a seal channel and adjacent mounds of material of the component. The mounds of material can comprise protrusions, projections or bumps of the same material forming the component itself. The component can be formed by any suitable manufacturing method. In examples, the component can be manufactured using any hot forming process that uses a molten or softened metal. Thus, the methods described herein are particularly applicable to die casting, investment casting, sand casting and forging processes where suitably malleable materials are typically used, such as aluminum and magnesium alloys, and even titanium alloys. The seal channel can comprise a groove that extends into a planar mate face of the component. The seal channel can have a bottom portion against which a seal member can seat, as well as side portions connecting the bottom portion to the mate face. The projections can comprise an extension of one or both of the side portions of the seal channel that extend in a direction away from the bottom portion out past the mate face. The projections can have widths along the seal channel that is less than the total length of the seal channel and less than a length of a side or segment of the seal channel. Mold or die cavities used to form the component can include geometry to form the mounds or bumps of material.

At step 104, the component can be loaded into a fixture that is configured to precisely hold the component relative to a punching machine. In particular, the fixture can hold the mate face parallel to an impact face of a punch of the punching machine.

At step 106, the mate face of the component can be aligned with punch of the punching machine and secured in place. As such, the component can be immobilized and fixed in place to receive a strike from the punch.

At step 108, the punch can be advanced using any suitable motive force to deform the mounds. In examples, the punch can be actuated by a hydraulic cylinder and an associated hydraulic system. The punch can be advanced such that the impact face of the punch engages tips or tops of the projections and continues until it engages the mate face.

At step 110, mound material of the mounds can be extended into the seal channel to form retention tabs. Material of the mounds can be upset by the punch to be mechanically and plastically displaced into the seal channel. The material will move along the path of least resistance, which will be along the seal channel since less material of the component is located there to resist movement of the mound, as opposed to the opposite side of the mound where there is no seal channel and material of the component can resist flow of mound material in that direction. As such the material will flow into the seal channel along the impact face of the punch to form a flat surface that comprises an extension of the mate face of the component that overhangs the bottom portion of the seal channel.

At step 112, the component can be removed from the fixture for further processing and eventual assembly with another component of a system.

At step 114, finishing procedures can be performed on the component. For example, the component can be deburred, polished and machined, such as drilled to form fastener bores.

At step 116, the component can then be transported to an assembly location for assembling the component with a seal member and a system component.

At step 118, a resilient seal member can be assembled with the component by deforming the seal member to fit past the retention tabs. For example, the seal member can be laid out on top of the seal groove and on top of the retention tabs.

At step 120, the seal member can be pushed or pressed between the retention tabs and an opposing side portion of the seal channel or another opposing retention tab. The seal member can compress as it moves past the retention tab.

At step 122, the seal member can be expanded back to its undeformed size or to a nearly undeformed size underneath the retention tabs. As such, the seal member can be expanded to a size wider than a distance between a tip of the retention tab and the opposing side portion of the seal channel. Additionally, portions of the seal member can expand to project beyond the mate face to permit deformation when mated with another system component to facilitate sealing. Thus, the seal member is prohibited from escaping from the seal channel under its own power.

At step 124, the component can be moved to an assembly location for mounting to another system component. The component can be oriented such that the mate face into which the seal channel is located extends to match an orientation of a mounting face of the system component to which the component is to be mounted. For example, the component can be oriented vertically to mount on a vertically-oriented mounting face. However, the mate face and the mounting face can be oriented in other orientations, including horizontal and oblique orientations. In such an orientation, the retention tabs prevent the seal member from falling out of the seal channel.

At step 126, the mate face of the component can be engaged with the mounting face of the system component, such as in a vertical, horizontal or oblique orientation.

At step 128, the component can be fastened to the mounting face of the system component, such via the use of fasteners.

INDUSTRIAL APPLICABILITY

The present disclosure describes various systems, assemblies, devices and methods for manufacturing components with seal retention tabs and assembling sealed components with other components.

The retention tabs of the present disclosure are readily applicable to malleable metals used in casting and forging processes, such as aluminum and magnesium. Processes suitable for use with the present disclosure include, but are not limited to, die casting, investment casting, sand casting and forging.

Formation of the retention tabs of the present disclosure, can utilize less expensive manufacturing and machining processes, as compared to machining dovetails into already-manufactured seal channels. For example, utilization of a punch press is a less expensive procedure that does not require precise measurement afterwards to validate manufacture.

The discretely spaced retention tabs can utilize less material than prior art shelfs or lips that extend all the way, or most of the way, around a perimeter of a seal channel and can therefore be more readily controlled during the formation process.

The retention tabs of the present application can also facilitate repeatable assembly with a seal member such that installation variances by assemblers are avoided. Furthermore, the retention tabs of the present application do require the use of assembly gels that can interfere with leak tests.

What is claimed is:

1. A method for manufacturing a component from a material to have a seal channel with a retention tab, the method comprising:
    forming a component from the material to have the seal channel disposed in a flat mate face and a plurality of mounds of the material adjacent the seal channel, the plurality of mounds of the material extending away from and integral with the flat mate face; and
    deforming the plurality of mounds of the material to form a plurality of retention tabs extending into the seal channel; and
    wherein deforming the plurality of mounds of material comprises flattening the plurality of mounds of material with a punch.

2. The method of claim 1, wherein:
    the punch comprises a flat impact face disposed parallel to the mate face of the cast component; and
    flattening the plurality of mounds of material with the punch comprises moving the punch toward the plurality of mounds of material in a direction perpendicular to the flat face and the mate face.

3. The method of claim 2, further comprising mounting the component in a fixture to hold the mate face parallel to the flat impact face of the punch.

4. The method of claim 1, wherein the component is formed from a malleable alloy and the plurality of mounds of the material are monolithic with the component such that the component, the seal channel, the flat mate face and the plurality of mounds of the material are formed of a continuous body of the malleable alloy.

5. The method of claim 1, wherein the component is formed using a hot forming process that uses a molten or softened metal.

6. The method of claim 1, wherein the plurality of mounds of material are spaced apart from each other at discrete locations along opposing sides of the seal channel.

7. The method of claim 1, wherein the plurality of mounds of material are spaced apart from each other at discrete locations along a single side of the seal channel.

8. The method of claim 1, wherein the plurality of mounds of material are spaced apart from each other at irregular intervals.

9. A method for manufacturing a component from a material to have a seal channel with a retention tab, the method comprising:
forming a component from the material to have the seal channel disposed in a flat mate face and a plurality of mounds of the material adjacent the seal channel, the plurality of mounds of the material extending away from and integral with the flat mate face;
deforming the plurality of mounds of the material to form a plurality of retention tabs extending into the seal channel;
deforming a resilient seal strip by pushing the resilient seal strip against the plurality of retention tabs; and
moving the resilient seal strip past the plurality of retention tabs and into the seal groove.

10. The method of claim 9, wherein the component is formed from a malleable alloy and the plurality of mounds of the material are monolithic with the component such that the component, the seal channel, the flat mate face and the plurality of mounds of the material are formed of a continuous body of the malleable alloy.

11. The method of claim 9, wherein the component is formed using a hot forming process that uses a molten or softened metal.

12. The method of claim 9, wherein the plurality of mounds of material are spaced apart from each other at discrete locations along a single side of the seal channel.

13. The method of claim 9, wherein the plurality of mounds of material are spaced apart from each other at irregular intervals.

14. A method for manufacturing a component having a seal channel with a retention tab, the method comprising:
forming a monolithic component to have:
a flat mate face extending in a plane;
the seal channel extending into the flat mate face; and
a plurality of mounds of material adjacent the seal channel, the plurality of mounds of material extending away from the flat mate face opposite the seal channel; and
deforming the plurality of mounds of material to form a plurality of retention tabs monolithically extending into the seal channel; and
wherein deforming the plurality of mounds of material comprises flattening the plurality of mounds of material with a punch.

15. The method of claim 14, wherein:
the seal channel extends perpendicularly into the plane in a first direction;
the mound of material extends perpendicularly away from the plane in a second direction; and
each of the plurality of retention tabs extends parallel to the plane.

16. The method of claim 14, wherein:
the punch comprises a flat impact face disposed parallel to the mate face of the cast component; and
flattening the plurality of mounds of material with the punch comprises moving the punch toward the plurality of mounds of material in a direction perpendicular to the flat face and the mate face.

17. The method of claim 14, wherein the component is formed from a malleable alloy and the plurality of mounds of the material are monolithic with the component such that the component, the seal channel, the flat mate face and the plurality of mounds of the material are formed of a continuous body of the malleable alloy.

18. The method of claim 14, wherein the component is formed using a hot forming process that uses a molten or softened metal.

19. The method of claim 14, wherein the plurality of mounds of material are spaced apart from each other at discrete locations along opposing sides of the seal channel.

20. The method of claim 14, wherein the plurality of mounds of material are spaced apart from each other at irregular intervals.

* * * * *